United States Patent [19]
Riehl

[11] Patent Number: 4,635,743
[45] Date of Patent: Jan. 13, 1987

[54] VEHICLE FRONT WHEEL ASSIST DRIVE OVERSPEED CONTROL SYSTEM

[75] Inventor: David C. Riehl, Shelby, Ohio
[73] Assignee: Dresser Industries, Inc., Dallas, Tex.
[21] Appl. No.: 599,368
[22] Filed: Apr. 12, 1984
[51] Int. Cl.$^4$ .............................................. B60K 25/00
[52] U.S. Cl. ..................................................... 180/243
[58] Field of Search ............... 180/242, 243, 197, 233, 180/248

[56] References Cited

U.S. PATENT DOCUMENTS

| | | | |
|---|---|---|---|
| 3,552,516 | 1/1971 | Beard | 180/243 |
| 4,286,686 | 9/1981 | Franke | 180/233 |
| 4,401,182 | 8/1983 | Pollman | 180/242 |
| 4,444,286 | 4/1984 | Hawkins | 180/243 |

Primary Examiner—John J. Love
Assistant Examiner—Everett G. Diederiks, Jr.
Attorney, Agent, or Firm—Richard M. Byron

[57] ABSTRACT

A front wheel drive speed control system for a vehicle having a main rear wheel drive and an assisting hydraulically powered front wheel drive. A hydraulic pump is connected by a hydraulic circuit to a hydraulic motor at each driven front wheel. A clutch assembly between the hydraulic motor and the associated wheel facilitates rotation of the driven front wheel. A speed sensing device is mounted to sense speed of the main rear wheel drive and each driven front wheel. A speed control system is connected to the speed sensing devices and to the hydraulic pump and is operable to terminate the pumps operation when the speed of the main rear wheel drive exceeds a predetermined speed and to resume assisting operation of the driven front wheel when the speed of the main rear wheel drive drops below a second predetermined speed.

5 Claims, 4 Drawing Figures

VEHICLE FRONT WHEEL ASSIST DRIVE OVERSPEED CONTROL SYSTEM

BACKGROUND OF THE INVENTION

This invention relates to control systems for auxiliary locomotion drive systems of a vehicle. More specifically this invention relates to a speed control system for the front wheel assisting drive of a vehicle having a main rear wheel powered drive. Many vehicles are typically driven by applying drive power to the rear wheels thereof. Some vehicles are provided with an auxiliary drive system connected to the front wheels thereof for use during low speed operation of the vehicle powering the front wheels to assist where tractive conditions are either poor or variable and the rear wheels are likely to slip.

A vehicle is a construction machine such as a motor grader. Powering of the front wheels is a benefit when the machine is operating on a slippery surface such as sand, mud, snow or ice, particularly during low speed operations of the machine. When such a machine is operated at a low speed, if the front wheels rotate at the same rate as the rear wheels, a continuous assisting action is provided, thus changing the driving and operating characteristics of the vehicle from that which an operator would experience for a normally only rear wheel driven vehicle.

For operation of a vehicle, such as a motor grader, in a high speed mode of operation, such as between 10 and 25 m.p.h. for high speed grading, snow removal and general transport between two locations, the front wheel assistance is not necessary. During such operation, if a front wheel powering system is in operation, it must be capable of operating at this speed, which is substantially higher than the speed at which it provides a useful drive assistance. For motor graders that have mechanical rear wheel drive and would incorporate a hydraulically assisted front wheel drive, operation at a high speed can present overheating problems for the hydraulic system serving the assisting front wheel. Overheating would be due to forced operation of the hydraulic system beyond it's normal expectant capacity. More specifically, the hydraulic drive system is designed to provide rotation of the front wheel up to a speed of about 12 m.p.h. Above that speed it has been found that continued operation of the assisting front wheel drive is not necessary because grading with the vehicle and maneuvering are done at speeds below that and it is those speeds at which the driving assistance of the front wheel is needed. The hydraulic circuit is designed for operation of a speed of about 12 m.p.h. or below and operation above that speed exceedingly stresses the system, thus raising the potential for failure of operation.

SUMMARY OF THE INVENTION

This invention is a front wheel drive speed control system for a vehicle having a main rear wheel drive and a temporarily operable assisting front wheel drive. The speed control system includes speed sensing devices mounted on the vehicle to sense the rotating speed of the main rear wheels and of the driven front wheel. A control circuit is connected to the speed sensing devices and to a hydraulic circuit used in powering the assisting front wheel. The speed control circuit functions to temporarily terminate drive assisting operation of the driven front wheel when the speed of the main rear wheel drive is greater than a first predetermined speed and then re-engage assisting operation of the front wheel when the main rear wheel drive speed is substantially decreased.

One object of this invention is to provide a front wheel drive speed control system overcoming the aforementioned disadvantages of systems without such control.

Still, one other object of this invention is to provide a front wheel speed control system for a vehicle having a hydrostatic drive assisting front wheel, or wheels, on a vehicle such as a construction machine.

It is a further object of this invention to provide a speed control system for such a vehicle described above, which will permit operating of the vehicle with the assistance of the driven front wheel at low speeds and in both forward and reverse directions where assistance is needed for maneuvering the vehicle and for its normal low speed operations, yet disengageable at higher speeds so that dynamic braking due to the hydraulic drive system of the front wheel is not encountered.

Still, another object of this invention is to provide a front wheel drive speed control system for the vehicle as described above wherein the assisting front wheel drive can be operated to function in a normal mode of operation at a speed slightly less than the main rear drive speed, so that slippage of the main rear wheels then enhances the assisting ability of the driven front wheels. And, in an aggressive mode of operation, the control system operates the assisting front wheel at a speed slightly greater than that of the rear main drive wheels in order to provide continual assistance in propelling the vehicle.

Various other objects, advantages and features of this invention will become apparent to those skilled in the art from the following discussion, taken in conjunction with the accompanying drawings, in which:

The following is a discussion and a description of preferred specific embodiments of the front wheel drive speed control system of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION

Figure 1:
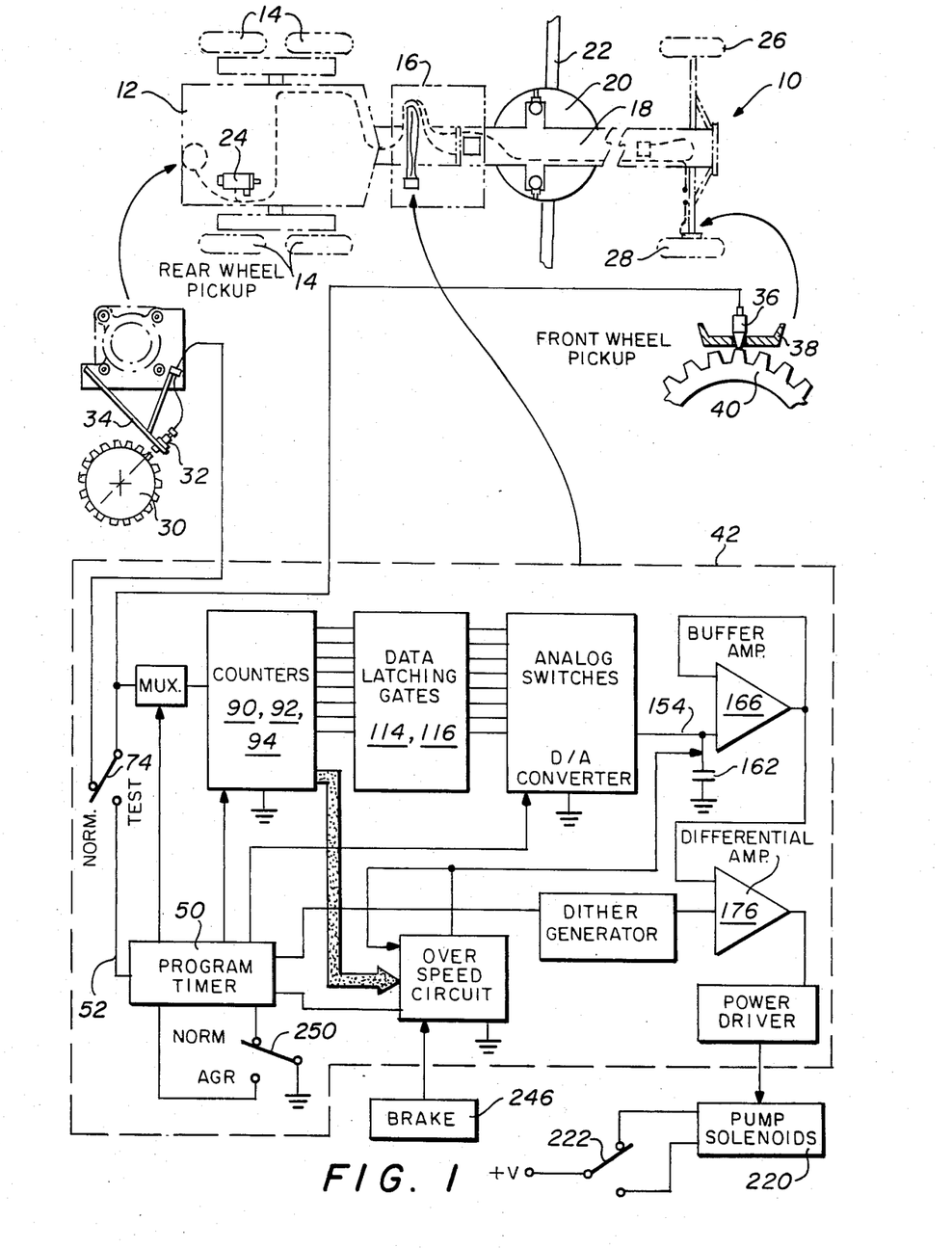
FIG. 1 is a pictorial plan view of a motor grader having the front wheel drive speed control system of this invention with the speed pickup devices shown with arrows indicating their appropriate locations on the vehicle, and connected to a block diagram illustrating functional elements of the speed control circuit.

Referring to FIG. 1, where shown therein is a vehicle, such as a construction machine vehicle with a rear wheel main drive and a bi-directional hydrostatically driven assisted front wheel drive. In particular, the vehicle shown is a motor grader indicated generally at 10. Although a motor grader is illustrated as embodying the present invention, it should be understood that other types of multi-wheel vehicle 5 can also utilize the front wheel assist drive and the drive control system of this invention. Motor grader 10 includes a platform frame structure 12 at the rear thereof mounting a drive engine and supported above the drive mechanism for the rear wheels 14. An operator's cab 16 is mounted ahead of the rear platform frame on an elongated front main frame 18. Front main frame 18 is operably connected to the front wheel assembly of the vehicle. Below a mid-portion of front main frame 18 a mold board 20 is supported by a hydraulically actuated linkage. The grader's blade 22 is operably mounted below mold board 20 and the mold board is used to control the position of the blade.

The vehicle engine mounted on rear platform frame 12 powers a hydraulic pump 24 that is connected by a hydraulic circuit to hydraulic motors of the drive mechanism at each of the vehicle's front wheels 26 & 28. The drive mechanism for each of the front wheels has the hydraulic motor rotating a bull gear that is connected by an overrunning and a friction clutch to the associated front wheel. The overrunning clutch is actuated when the hydrostatic drive is in operation in the forward direction and the hydraulic motor is operated. The overruning clutch connects the motor to the associated bull gear with the wheel. The friction clutch operates when the vehicle moves in the reverse direction by appropriate control valves in the hydrostatic drive system. When hydrostatic flow in the hydraulic system is dropped to a non-operative flow level, then both clutches are disengaged and the front wheel assist drive is terminated. Hydraulic pump 24 is driven from the vehicle transmission so its output is coordinated with the operating speed of the vehicle's rear wheels in order that the front wheels are rotated in accordance with the rear wheels. Specific correlation of the vehicle wheel speeds will be discussed later in this specification.

The vehicle's transmission has a transmission output shaft 30 that rotates in a predictable relation to the rotation of the vehicle's rear or main drive wheels 14. In the upper left hand portion of FIG. 1 there is shown a sensing device for sensing the speed of rotation of transmission output shaft 30 and in turn providing an input source of information for the control system of the speed of rotation of the vehicle's rear main drive wheels. This sensing device includes a digital magnetic pickup 32 having its sensing element positioned adjacent to the outer periphery of output shaft 30. The splined outer surface of this output shaft, when rotating, provides a signal source for digital magnetic pickup 32 that is functionally related to rotation of the vehicle's rear wheels and in turn the speed of the vehicle. Rear wheel digital magnetic pickup 32 is supported by a mount 34 attached to the vehicle structure.

At the front wheels of the vehicle, a front wheel digital magnetic pickup 36 is supported by a mount 38 and located with its sensing element in proximity to the exterior of the associated wheels bull gear 40. This construction is illustrated in the upper right hand portion of FIG. 1 for the right front wheel of the vehicle. Both of these digital magnetic pickups 32 & 36 provide high amplitude, square wave pulses through connecting lines to the control box 42. Control box 42 is illustrated in FIG. 1, contains the electronic circuitry of this system and it is mounted on the vehicle inside an operator cab 16.

Figure 2A:
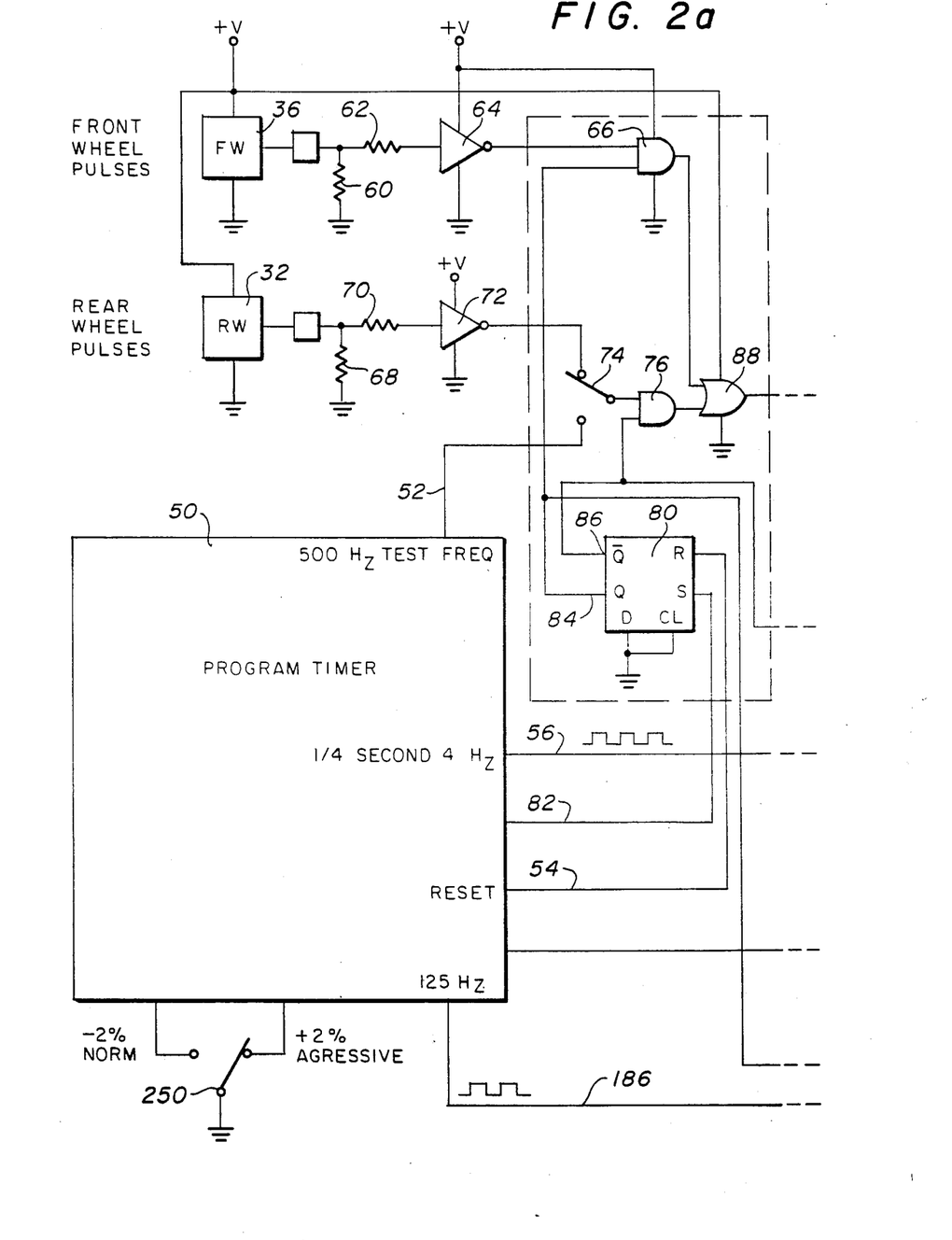
FIGS. 2a–2c are a schematic diagram of the speed control circuit for the system of this invention.
Figure 2B:
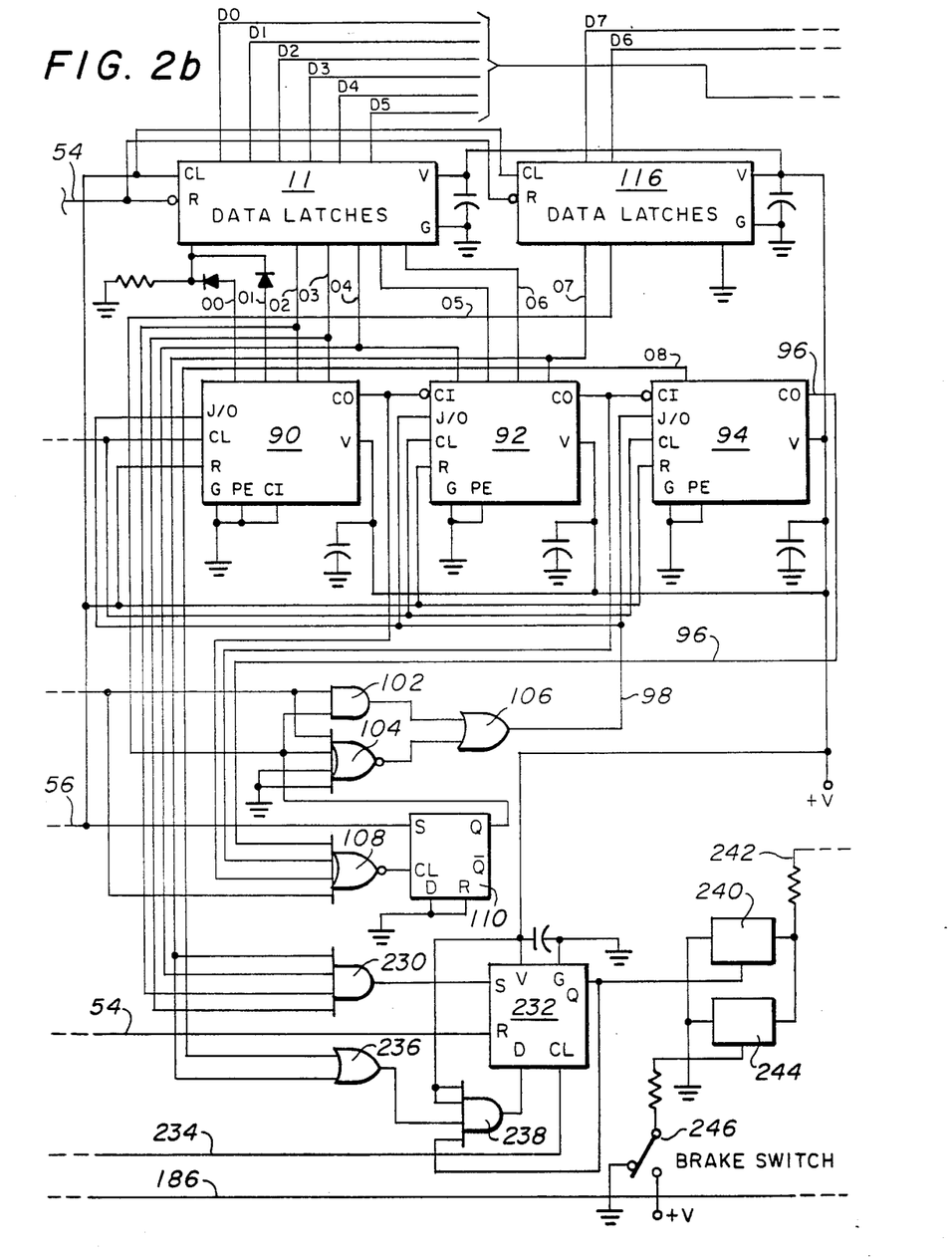
Figure 2C:
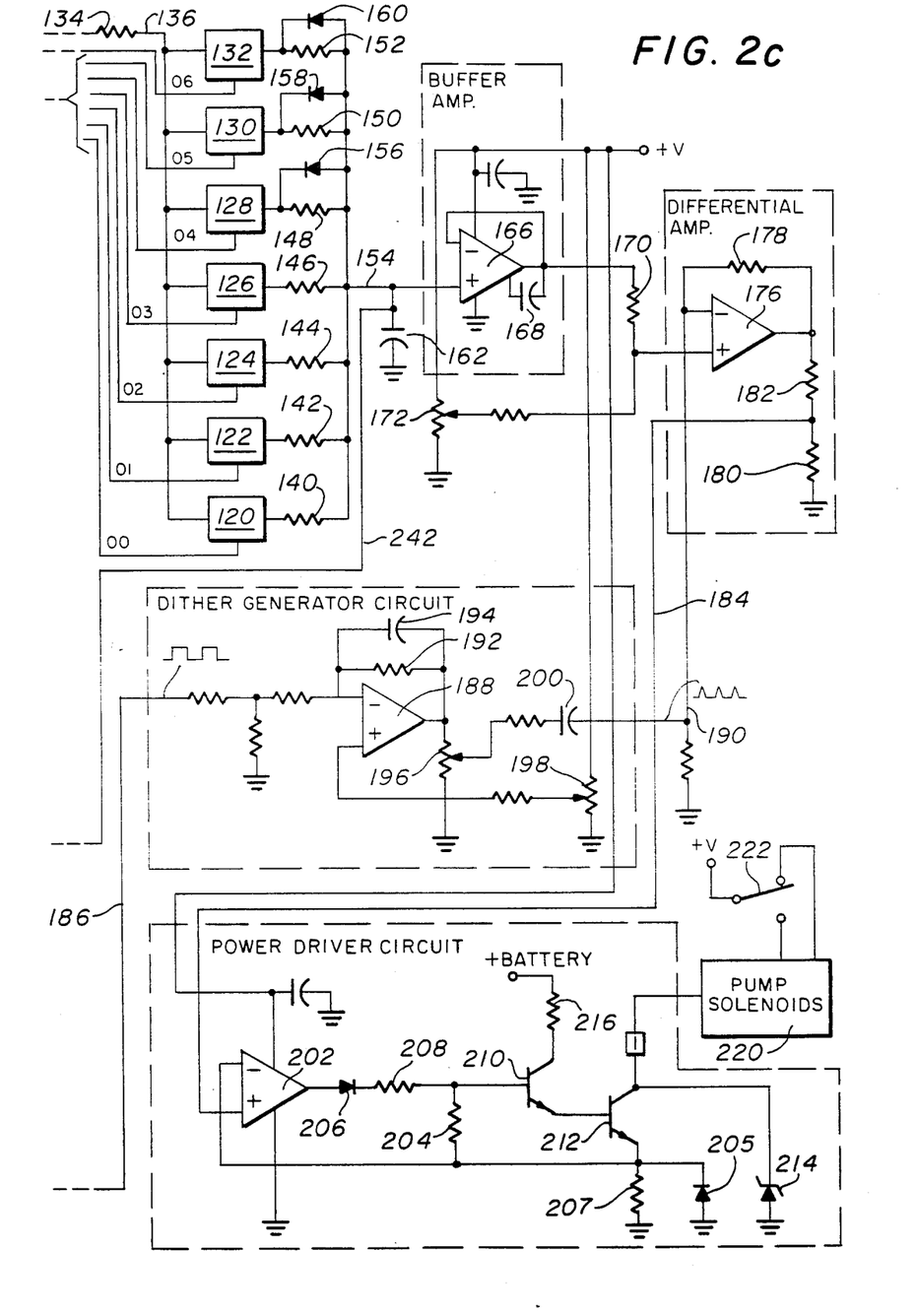

Referring to FIGS. 1 and 2 the following describes the electronic circuits shown therein. Control box 42 shown in FIG. 1 contains in block diagram form the functional elements comprising the electronic circuit. This circuit is shown in greater detail in FIGS. 2a, 2b and 2c. The power supply for the electronic circuit is not shown in the drawings because it is a typical state of the art power supply providing both regulated and unregulated positive and negative voltages used by the functional components of this electronic equipment as is well known in the field of electronics.

Program timer 50 includes a 12 bit timer circuit having several outputs and two basic modes of operation. In a normal mode of operation, the program provides timing signals such that the vehicle front wheels are rotated slightly slower than the rear wheels so that as the rear wheels begin to slip, the assisting action of the front wheels becomes effective. In a second, or aggressive mode of operation, program timer 50 provides signals that cause the vehicle's front wheels to be rotated slightly faster than the vehicle's main rear drive wheels. This mode of operation has advantages when operating the vehicle in slippery traction conditions so the front wheels provide a slight pulling and stabilizing effect on the vehicle. Program timer 50 provides a plurality of output signals used in operation of the circuit. A 500 hertz test signal is provided on line 52 to be used for a test of the operational readiness of the system so that a vehicle operator can determine if the front wheel drive speed control system is operational and ready for use. A reset signal is provided on line 54 and is used to control several functions in the control system. This reset signal is used in initialization of the system prior to the start of actual operation. A clock signal is supplied on line 56 and operating at four (4) hertz frequency. This clock signal is used by the counter portion of the circuit.

Referring to the upper portion of FIG. 2a, a single input source from the front wheels is provided by magnetic pickup 36 and the signal source from the rear wheels is provided by magnetic pickup 32. These separate input sources are separately filtered and buffered before entering the logic circuit. Front wheel input from magnetic pickup 36 is connected to a load limiting resistor 60 that is tied to ground. From there through a current limiting resistor 62 to an input of a schmidt triggered buffer inverter 64 and from this inverter to one input of an AND gate 66. The rear wheel input signal follows a similar path to a load limiting resistor 68 that is tied to ground, through a current limiting resistor 70 to an input of a separate schmidt triggered buffer inverter 72. From this inverter a signal passes through a test switch 74 that in one position connects this signal to one input of AND gate 76.

Test switch 74 is used to alternately connect the rear wheel pulse signal or the 500 hertz test signal to the input of AND gate 76. The functioning of this test signal will be described in greater detail in the operation of the system.

A multiplexing circuit is provided by a flip-flop 80 being connected to the AND gates 66 and 76 and to an OR gate 88 for providing a data signal representative of the vehicle speed to a counter circuit. Flip-flop 80 has its set input line 82 connected to program timer 50 and its reset input connected to program timer reset signal line 54. The Q-output signal from flip-flop 80 provides an enable front wheel signal on line 84 that is connected to one input of AND gate 66 and to the clear input of another flip-flop 232. An enable rear wheel signal is provided by the not-Q-output of flip-flop 80 on line 86 and connected to the second input of AND gate 76 and communicated with other portions of the logic circuit to be described in the following. The output of AND gate 66 along with the output of AND gate 76 are connected to the inputs of an OR gate 88. The output of OR gate 88 is connected simultaneously to the clock input of three separate counter circuits 90, 92, and 94. Flip-flop 80 will switch at a rate determined by a set pulse from program timer 50 between its two outputs, thus providing an alternating data signal representative of the front wheel pulse rate and the rear wheel pulse rate.

An offset counter and data latching gate circuit in the upper portion of FIG. 2b is connected to the output of the multiplex circuit for counting the relative direction, up or down, of the front wheel and rear wheel pulse signals. The output from OR gate 88 is connected simultaneously to the clocking input of three counter circuits 90, 92, and 94. All three counters 90, 92, and 94 receive a simultaneous synchronizing input signal at the 4 Hz rate from line 56 of program timer 50. These counters are connected in series with the output of counter 90 connected to the counter input of 92; and the output of counter 92 connected to the input of counter 94. The output of counter 94 is provided on line 96. Each of the counters has the input/output trigger port connected together and joined to line 98 for simultaneous operation. These counters will function in both an up counting and a down counting mode. The direction of the up or down counting is controlled by the enable rear wheel signal from the not-Q-output 86 of flip-flop 80. The counters will count in the upper direction for rear wheel pulse signals and they will count in the down direction for front wheel pulse signals. When the down count from front wheel pulse signals is greater than the up count from the rear wheel pulse signals then the counter circuits will switch and count up.

The count sequencing from the enable rear wheel signal is used in order to accomplish the above described operations. This includes the enable rear wheel signal being supplied to a logic sequencing circuit with the output of the logic sequencing circuit connected to line 98 joining the input, output ports of the counters. In the sequencing circuit the enable rear wheel pulse on line 86 is supplied to one input of a two input AND gate 102, and also to one input of a four input OR gate 104. The output of AND gate 102 and OR gate 104 are connected to the inputs of another OR gate 106 that has its output at line 98 to the input/output ports of the counters. The enable rear wheel signal is also supplied to one input of a four input OR gate 108. The other inputs of this OR gate are connected to the counter output lines of counters 90, 92, and 94 respectively. The output of OR gate 108 is connected to the clock input of a flip-flop 110. The setting input to flip-flop 110 is the 4 Hz signal of program timer 50. The D latch and reset terminals of flip-flop 110 are grounded and the Q-output is connected to one input of AND gate 102, one input of OR gate 104 and also supplied to a data latch 116.

The data outputs from counters 90, 92, and 94 are supplied through a plurality of data bit lines (indicated at 00 through 08) to data latch circuits 114 and 116 shown in the upper portion of FIG. 2b. Each of the data latches receives a reset signal on line 54 from program timer 50. They also receive a clock signal on line 56 from the program timer. Data is transferred from the counters to the data latches with a pulse from the program timer at the end of the timing interval of the 4 Hz program timer signal on line 56. This transfers the data at the end of the counting cycle and the counters are then cleared for the next counting cycle. Data latch 114 is supplied with data output lines D0, D1, D2, D3, D4, and D5 as indicated. Data latch 116 is provided with output data lines D6 and D7 as illustrated. As the count data from the counters is increased in quantity the data lines D0–D7 are by number increasingly shifted from a logic low to a logic high in correlation with increased vehicle speed for use in a digital to analog converter.

Referring to FIG. 2c, the upper left hand portion of this figure contains a simple digital to analog converter receiving digital data from data lines D0–D7. Data lines D0–D6 are each respectively connected to an analog switch indicated at 120, 122, 124, 126, 128, 130, and 132 respectively. Also data line D7 is connected through a current limiting resistor 134 to a bus line 136 common to each of the analog switches. The output of each analog switch 120, 122, 124, 126, 128, 130, and 132 are connected to individual resistors respectively 140, 142, 144, 146, 148, 150, and 152 that are in turn connected to a common output line indicated at 154. Resistors 148, 150, and 152 are each connected in parallel with diodes 156, 158, and 160. A buffer capacitor 162 is connected between the analog switch output line 154 to ground. The presence of diodes 156, 158, and 160 across the resistors in combination with the associated analog switches and the current limiting resistor 134 in data line D7 create a time constant control of the voltage level in output line 154. This capacitor has the effect of smoothing the input signal to a following buffer amplifier stage. In operation of this digital to analog circuit the vehicle speed is represented by the enable rear wheel pulses causes the data pulses in data lines D0–D7 to change from low to high as the vehicle speed increases. As this occurs the associated analog switch for each data line is turned on thus changing the analog voltage present in the switch output line 154. In practical operation it has been determined that a change from zero volts to about eight volts total is sufficient and can be used for control as desired.

A buffer amplifier stage is connected to output line 154 from the group of analog switches. A high gain operational amplifier 166 has the positive input thereof connected to analog switch line 154 and a feedback capacitor of 168 for stabilization. The output of this amplifier is through a current limiting resistor 170 to the input of a following differential amplifier stage. In order to make the d.c. level input to the differential amplifier stage variable an offset adjustment is provided with a variable resistor 172 connected between ground and a relatively high d.c. voltage. The wiper of this variable resistor 172 is connected through a current limiting resistor joining the output of resistor 120 at the input differential amplifier 176. The output voltage signal from the buffer amplifier stage includes a d.c. voltage bias component and a variable voltage component representative of vehicle speed.

Differential amplifier 176 is used to compare the input signal from the buffer amplifier stage with the input from a dither generator circuit and in turn produce a variable voltage above and below the signal input level as an output. Differential amplifier 176 is provided with a feedback resistor 178 for stability. A voltage divider network of resistors 180 and 182 is provided to scale the amplifier's output with the output on line 184.

The dither generator circuit in FIG. 2c has an input of a 125 Hz square wave signal from program timer 50 carried on line 186. This square wave signal is integrated by an operational amplifier 188 to produce a 125 Hz triangular wave as an output signal on output line 190. The square wave is applied to the inverting input of operational amplifier 188. A capacity feedback loop including resistor 192 and parallel capacitor 194 accomplishes integration of the square wave signal producing the triangular wave output. An amplitude adjustment is provided by variable resistor 196 connected between the amplifier output and ground. A symmetry adjustment is provided by variable resistor 198 connected between ground and a positive potential voltage with the wiper connected to the non inverting input of operational amplifier 188. The output from the dither generator circuit is provided with a current limiting resistor and it is capacitively coupled through capacitor 200 to output signal line 190, thus supplying the triangular wave signal to the inverting input of differential amplifier 176.

In operation of the differential amplifier stage circuit it functions to compare the dither voltage with the combination voltage signal from buffer amplifier 166. This combination voltage signal includes the d.c. offset voltage and the signal voltage. The offset adjustment is used to provide a minimum voltage output from the differential amplifier. This is needed in order to ensure the following stage of the circuit provides a minimum operating current for actuation of the hydraulic pump operating solenoid. The comparison of these voltages results in a d.c. variable voltage output signal on output line 184 that is connected to the input of the power driver circuit in the lower portion of FIG. 2c.

The power driver circuit includes an operational amplifier 202 connected in a differential amplifier configuration. Feedback for this amplifier is provided by a feedback resistor 204 and associated polarity control diode 205 being in series with the amplifier's output. Output from operational amplifier 202 is through a diode 206 and a series connected associated current limiting resistor 208 to the base of power transistor 210. A second power transistor 212 is connected in a emitter-follower configuration as shown with emitter resistor 207 tied to ground. A zenor diode 214 connected between ground and the collector of power transistor 212. A current limiting resistor 216 is provided between the collector of first power transistor 210 and a positive voltage supply from the vehicle's battery. The output from this power driver circuit is connected to the negative terminals of the operating pump solenoid 220 for the hydraulic pump used in supplying operating hydraulic fluid to the assist drive of the vehicle's front wheels. The circuit element identified as PUMP SOLENOIDS 220 includes one solenoid that when actuated will connect the hydraulic circuit for forward rotation of the motors and wheels and a separate solenoid that when actuated will connect the hydraulic circuit for reverse rotation. A selector switch 222 is controlled by the vehicle transmission on gear selector and connected to supply positive voltage to the appropriate solenoid. In operation as voltage on power driver circuit input line 184 increases the current output to pump solenoid 220 increases which in turn causes the hydraulic pump's output to increase in relation thereto. As the pump's output increases so does the rotating speed of the vehicle's front wheels until the speed reaches a predetermined value. Hydraulic controls can be manipulated to limit the maximum assist force of the front wheels by limiting the pressure and volume supplied to the associated wheel drive motors.

In the operating condition when the vehicle's rear wheel speed increases above a predetermined maximum assist driving speed of the front wheels then it is necessary to terminate the assisting operation of the front wheels. This predetermined maximum speed depends upon the specific hydraulic and mechanical specifications of the machine. For example 20 miles per hour may be such a speed limit for some vehicles while 10 miles per hour is sufficient for others. It has been determined that for some motor graders 12.7 miles per hour is satisfactory. To accomplish this an overspeed circuit is provided as shown in the lower portion of FIG. 2b. This overspeed circuit functions to monitor selected data bits from counters 90, 92 and 94 when the enable front wheels pulse is present. Then, when the proper relationship of these data bits exists then analog switch 240 is activated and the associated buffer amplifier in the upper portion of FIG. 2c is grounded thereby changing the input to the differential amplifier and in effect dropping the voltage in variable voltage line 184 to the offset voltage level. This change causes the then energized one of the pump solenoids 220 to be closed and assisting operation of the hydraulic motors is then terminated. Additionally, the circuit includes a brake switch that will also cause termination of the assisting drive when the vehicle operator applies the brake.

The overspeed circuit includes a four input AND gate 230 connected to sample data bits 02, 03, 04, and 07 as illustrated. A flip-flop 232 is provided and receives a set signal from the output of AND gate 230, a reset signal from the reset pulse source in program timer 50 on line 54, and the clock input from the enable front wheel pulse on line 234 originating from the not-Q-output 86 of flip-flop 80. A delay input is generated by OR gate 236 having one input from bit 07 of counter 92 and another bit 09 from counter 94. The output of OR gate 236 is supplied to one input of a four input AND gate 238. A pair of inputs to this AND gate 238 are connected to the positive voltage supply and the final input is connected to the Q-output of the associated flip-flop 232. The Q-output of this flip-flop 232 is also connected to the control input of an analog switch 240. Analog switch 240 is connected between ground and buffer capacitor 162 through a limiting resistor via line 242. Buffer capacitor 162 is located at the input of the buffer amplifier stage in the upper portion of FIG. 2c. A brake analog switch 244 is connected in parallel to analog switch 240 and provided with a control input through a limiting resistor to a vehicle brake switch 246 to ground. The brake switch is moved when the vehicle operator applies the brake thereby applying a positive voltage to the control input of analog switch 244 that in turn grounds the buffer amplifier stage input.

Operation of the overspeed circuit is best explained in terms of increasing vehicle speed. At this point it should be noted that this system will function the same for forward vehicle movement as for rearward vehicle movement to control overspeed of the hydraulic assist drive system. As the vehicle increases its speed counters 90, 91, and 92 count the enable rear wheel pulses whereupon the data lines between the counters and data latches as shown in the upper portion of FIG. 2b and indicated at 00-08 are changed from a logic low to a logic high as speed increases between predetermined ranges. For example bit 00 is low until the vehicle reaches a speed of between 0.08 to 0.15 m.p.h. then it changes to a logic high. At this time the remaining bits 01-08 are low. Bit 01 becomes high when the vehicle speed is in the range of 0.16 to 0.24 m.p.h. Bit 07 becomes high at a speed of approximately 10 m.p.h. and bit 08 becomes high at a speed of approximately 20 m.p.h. When bits 02-07 are high this connects all of the analog switches shown on the upper left hand portion of FIG. 2c and the front wheel assist drive is operated at a speed of approximately 13 m.p.h.

For speeds above 10 m.p.h. bits 07 and 08 are set and remain high and they are connected to the inputs of OR gate 236 providing a logic high to AND gate 238. This AND gate 238 receives the output signal from flip-flop 232 as an input in order to maintain the high output to analog switch 240. As flip-flop 232 is connected it is reset at the reset rate from program timer 50 and as long as bits 07 and 08 are high the flip-flop will maintain a stable condition keeping analog switch 240 functioning thus grounding the buffer amplifier input at buffer capacitor 162. The functional result of the overspeed circuit is that as the vehicle speed increases to approximately 13 m.p.h. then the front wheel assist drive will operate. When the vehicle speed rises above this speed bits 07 and 08 will be high and analog switch 240 will maintain zero volts at the input to the buffer amplifier thus causing the front wheel assist drive to be disengaged.

As the vehicle decreases its speed bit 07 must become low before flip-flop 232 will release the high logic signal causing analog switch 240 to be disengaged. When bit 07 drops to or below approximately 10 m.p.h. then analog switch 240 is opened consequently the voltage input to the buffer amplifier is increased and the front wheel assist drive is re-engaged. The speed differential between approximately 10 m.p.h. and approximately 13 m.p.h. is significant in that it prevents oscillation of the system for minor changes in the vehicle speed at the critical speed where the assist drive is disengaged and engaged.

Obviously the exact speeds at which these changes are made is closely related to the type, size and character of vehicle on which the system is being used. For one vehicle the maximum speed for the assist drive may be 20 miles per hour and it may be desirable to turn off the assisting operation until it reaches a slower speed of 18 miles per hour or slower. For other vehicles 10 miles per hour may be the maximum assist drive speed and resumption of the assisting action may not be desirable until the vehicle speed is between about 5 to 8 miles per hour. For some motor graders speeds of 12.7 turn off and 10.4 miles per hour turn on speeds have been found to be satisfactory.

Referring to the program timer in FIG. 2a, it is provided with a control switch 250 changeable between a normal position and an aggressive position. Functionally in the normal position the program timer causes the front wheel assist drive to rotate the wheels at a rate slightly slower than the rear wheels. In practice an amount of approximately 2% has been found satisfactory. Driving the front wheels is done for the purpose of providing assistance once the rear wheels begin to slip. Thus the system operates to provide assistance when slippage of the rear wheels occurs in order to enhance stability and maintain traction efficiency in operation of the vehicle. When switch 250 is in the normal position the clock pulses and reset pulses from the program timer are as described in the above.

When switch 250 is in the aggressive mode position this causes the system to be operated with the front wheels driven at a rate of rotation faster than the rear wheels by a small amount. In practice it has been found that approximately 2% increase in wheel speed is sufficient. The aggressive mode of operation is used to stabilize the vehicle when operating in articulated or offset modes or conditions when the operator wants the front wheels to drive ahead of the rear wheels. These conditions may occur when the vehicle is operated on surfaces that are likely to cause wheel slippage such as ice, snow, sand, and mud. In this mode of operation the clock pulses are changed to an increased value that in turn causes the counters to shift the operating ranges through which the front to rear pulse counting ratio is changed. The net result is that operation of the hydraulic pump is advanced slightly over that of the normal mode of operation so the front wheels are rotated at a rate faster than that of the rear wheels.

Test switch 74 in FIG. 2a is used to test operational readiness of this system. When switch 74 is in the test position a 500 Hz signal is applied as if it were a rear wheel rotation. This causes a lurching action of the front wheels then stopping so the operator will see the system is ready for use.

It is apparent that from the foregoing description of the applicant's invention a comprehensive system has been provided to control the front wheel assisting drive of a multi-wheel vehicle having a hydraulically assisted front drive. The system is shown in a use for motor graders however such is clearly adaptable to other vehicles such as agricultural machinery, other forms of earth moving equipment, road maintenance and construction equipment, and other utility vehicles such as all terrain vehicles, forklifts, etc. Although preferred specific embodiments of this invention have been described in detail in the preceding description, this description is not intended to limit the invention to a particular form or embodiments disclosed herein since they are to be recognized as illustrative of the invention rather than restrictive. It would be obvious to those skilled in the art that the invention is not so limited. Thus the invention is declared to cover all changes and modifications of the specific example of the invention herein disclosed for purposes of illustration which does not constitute a departure from the spirit and scope of the invention.

In the embodiments of the invention in which an exclusive property or privilege is claimed are defined as follows:

1. A front wheel drive speed control system for a vehicle having a rear wheel drive and an assisting front wheel drive, coprising:
   (a) a hydraulic pump means operably connected by a hydraulic circuit to a hydraulic motor at each driven front wheel to cause rotation of that wheel;
   (b) an overrunning clutch assembly interposed between said motor and each associated wheel, engagable to facilitate rotation of said driven front wheel in both forward and reverse directions;
   (c) a speed sensing means has main rear wheel drive sensor mounted with a vehicle transmission output to the driven rear wheels thereof operable to provide pulse signals indicative of the speed of rotation of said driven rear wheels;
   (d) a driven front wheel sensor mounted with said vehicle and operable to provide pulse signals indicative of the speed of rotation of said driven front wheel;
   (e) a comparator means operable to compare the rate of rear wheel pulse signals with a first predetermined rate to produce a front wheel enabling signal when said rear wheel pulse signals are below said first predetermined rate;

(f) a front wheel drive operating circuit means connected to said comparator means to receive said front wheel enabling signal and operable to activate said hydraulic pump means to cause rotation of said front wheel;

(g) said comparator means additionally has means to compare the rate of said front wheel pulse signals with a second predetermined rate to produce a front wheel disabling signal when said rear wheel pulse signal rate has increased above said first predetermined rate and is decreasing therefrom towards said second predetermined rate; and (h) said front wheel drive operating circuit means being connected to receive said front wheel disabling pulse signal and operable to maintain said hydraulic pump means in a deactivated condition until said rear wheel pulse signals are equal to said second predetermined rate whereupon said hydraulic pump means is activated to resume assisting rotation of said front wheel.

2. The front wheel assist drive in accordance with claim 1, wherein:

(a) said first predetermined rate is equivalent to a vehicle speed of between approximately 10 to 20 miles per hour and said second predetermined rate is equivalent to vehicle speed of between about 2 to 5 miles per hour slower than that of said first predetermined rate.

3. The front wheel assist drive in accordance with claim 2, wherein:

(a) said first predetermined signal rate is equivalent to a vehicle speed of about approximately 12.7 miles per hour, and said second predetermined signal rate is equivalent to a vehicle speed of about approximately 10.4 miles per hour.

4. The front wheel assist drive in accordance with claim 1, wherein:

(a) said speed sensing means has pulse signal pickup devices connected to a multiplex circuit with sensing device outputs connected to inputs of separate AND gates that are shared with separate outputs from a flip-flop circuit; outputs from said AND gates are connected to an OR gate with the output therefrom to a counter circuit;

(b) a program timmer circuit provides a resetting pulse signal to said multiplex flip-flop;

(c) said counter circuit has means to count pulses from said multiplex OR gate in an upcount mode with respect to rear wheel enable pulses from said multiplex flip-flop and in a down count mode with respect to said front wheel pulse signal;

(d) said counter circuit is connected to a data latch circuit having a plurality of output data signals selectively set in a high condition in correlation to the magnitude of the count of said counter circuit;

(e) a digital analogue switch circuit operably connected to said counter data latch circuit and operable to convert digital data from said data latch circuit into an analogue output voltage signal varying in magnitude in relation to counts from said counter means;

(f) an overspeed circuit connected to receive data bits from said counter circuit, a resetting pulse signal from said program timer, said front wheel enable pulse from said multiplex flip-flop and to provide a high voltage signal to the output of said analogue switch circuit in order to maintain said analogue output signal high when speed of said vehicle is above a first predetermined speed as determined by said rear wheel pulse signal rate being above said first predetermined signal pulse rate as determined by said counter circuit;

(g) an output circuit has a buffer amplifier connected to receive said analogue variable output voltage signal from said switch circuit by a differential adder amplifier with one input connected to said buffer amplifier and a second input connected to a dither circuit driven by said program timer circuit such that output from said differential adder amplifier is a variable voltage functionally related to the vehicle speed at said drive wheel; and a voltage to current converter circuit connected to receive the variable voltage of said output circuit and operable to produce an output current varying in magnitude proportional to said voltage input, and said voltage to current converter circuit being connected in series between a power source and a pump solenoid to pass current from said power source to said pump solenoid in proportion to said varying current in order to deliver a varying amount of hydraulic fluid to a hydraulic motor mounted at said driven front wheel in order to rotate said front wheel at a rate functionally related to the varying voltage magnitude of said analogue output voltage signal from said digital to analogue switch circuit for operably assisting motion of said vehicle.

5. The front wheel assist drive in accordance with claim 1, wherein:

a program circuit means is interconnected with said comparator means and said front wheel drive operating circuit means and operable to coordinate assisting drive rotation of said front wheel drive in a normal mode of operation where the vehicle front wheels are driven to a speed approximately about 2 percent less than the driven speed of the vehicle rear wheels, and alternatively in an aggressive mode of operation wherein the vehicle front wheels are driven at a speed of operation that is approximately about 2 percent greater than the driven speed of the vehicle rear wheels.

* * * * *